T. E. MURRAY.
METHOD OF ELECTRICAL WELDING.
APPLICATION FILED NOV. 29, 1916.
1,220,770.
Patented Mar. 27, 1917.
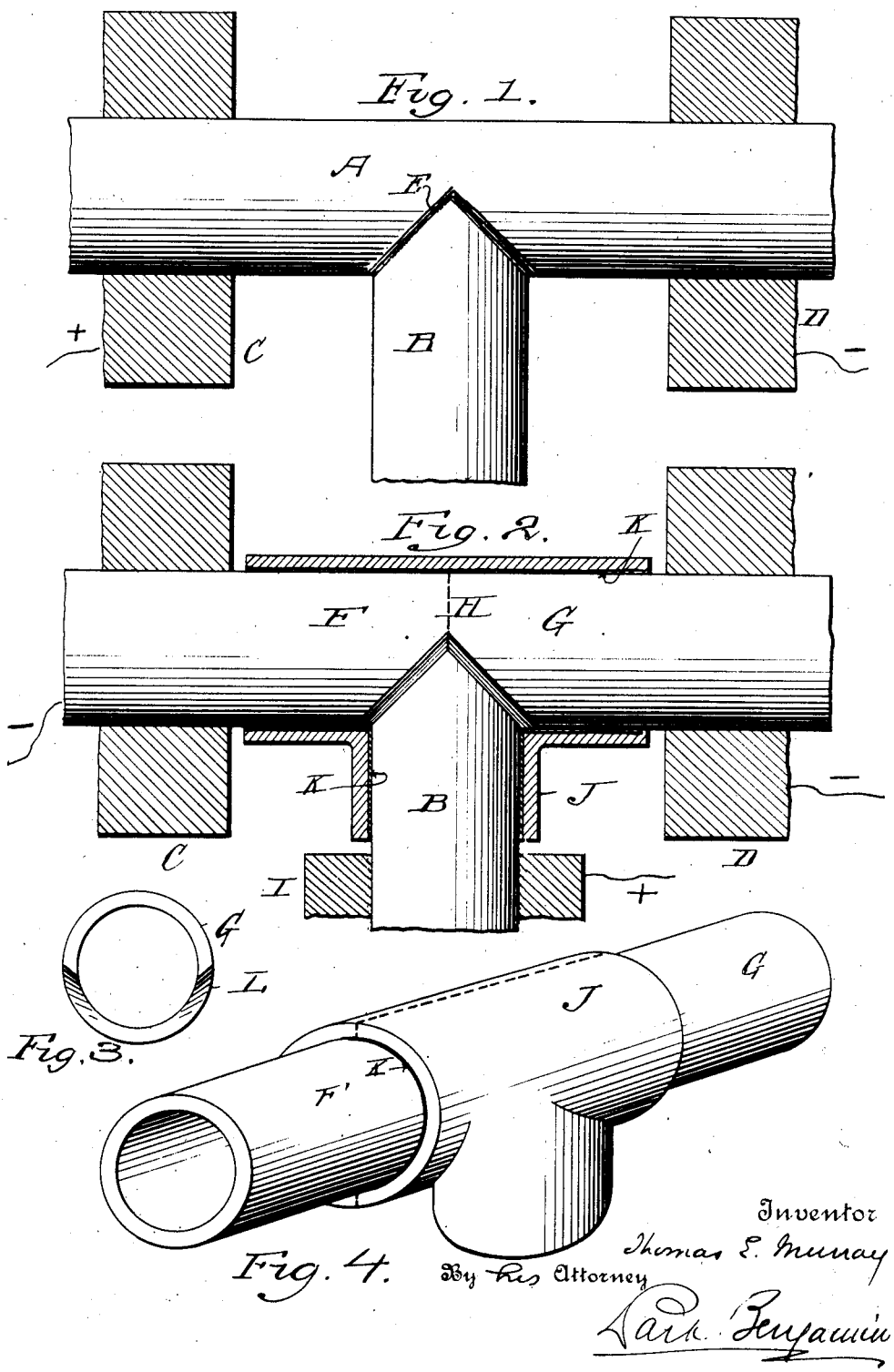
Inventor
Thomas E. Murray
By his Attorney
Park Benjamin

UNITED STATES PATENT OFFICE.

THOMAS E. MURRAY, OF NEW YORK, N. Y.

METHOD OF ELECTRICAL WELDING.

1,220,770.     Specification of Letters Patent.     Patented Mar. 27, 1917.

Application filed November 29, 1916. Serial No. 134,009.

*To all whom it may concern:*

Be it known that I, THOMAS E. MURRAY, a citizen of the United States, residing at New York, in the county of New York and State of New York, have invented a certain new and useful Improvement in Methods of Electrical Welding, of which the following is a specification.

The invention is a method of electrically welding together two tubes, or pipes, relatively at right angles to one another, and consists in the several steps set forth in the claims.

In the accompanying drawings—

Figure 1 is a side elevation of two tubes electrically welded in accordance with my method, the electrodes being shown in section. Fig. 2 is a similar view of three tubes so welded, with a T-shaped covering sleeve applied to the joint. Fig. 3 is an end view of one of the tubes to be welded, showing the half notch in said end. Fig. 4 shows in perspective the T-shaped covering sleeve of Fig. 2, and the tubes F, G entering the same.

Similar letters of reference indicate like parts.

In Fig. 1, I illustrate the mode in which I weld a tube at right angles to another tube. I form in the tube A, a notch having beveled sides converging to the central longitudinal axis of the tube. I bevel the end of the tube B on two sides to register and make contact with the sides of the notch when inserted therein, as shown in Fig. 1. I apply welding electrodes C, D to said tube A on opposite sides of the joint thus formed. The current in passing along tube A between the electrodes welds the end of tube B to the tube A, as indicated at E.

Instead of making the notch in the wall of a continuous tube, I may make one-half of said notch in the respective opposing ends of two tubes F, G. In Fig. 3, a half notch is shown at L in the end of tube G. I bring said ends together, as shown in Fig. 2. The beveled end of tube B is inserted, as before, in the notch formed by said half notches. The welded joint is then produced at the notch, as in Fig. 1, and also between the abutting edges of the tubes F, G. as shown by the dotted line at H, Fig. 2. In this case, however, the electrodes C, D on tubes F, G are connected to one terminal of the source of current, and an electrode I on tube B is connected to the other terminal.

I may inclose the joint in a T-shaped sleeve J, Figs. 2 and 3. In doing this I prefer to make the sleeve in two longitudinally divided half portions, as shown in Fig. 4, dotted lines, said parts being afterward united. I then insert the ends of tubes F, G and the end of tube B into said sleeve, approximating the edges to be jointed and passing the current to the joint, as already described.

It is preferable to coat the interior of sleeve J, or the exterior of tubes B, F, G with any fluid insulating medium, as indicated at K.

I claim:

1. The method of forming a welded joint between two tubes relatively at right angles to one another, which consists in forming in the wall of one of said tubes a notch having its sides converging to the longitudinal axis of said tube, beveling the end of the other tube to fit said notch, inserting said end in said notch, and establishing welding current through the joint.

2. The method of forming a welded joint between the ends of two tubes and a third tube at right angles to said first-named tubes, which consists in beveling an end of each of said first-named tubes to form unitedly a notch having its sides converging to the longitudinal axis of said tube, beveling the end of the third tube to fit said notch, inserting said end in said notch, and establishing welding current through the joint.

In testimony whereof I have affixed my signature in presence of two witnesses.

THOMAS E. MURRAY.

Witnesses:
GERTRUDE T. PORTER,
MAY T. MCGARRY.